(12) United States Patent
Parks et al.

(10) Patent No.: US 6,189,922 B1
(45) Date of Patent: Feb. 20, 2001

(54) INFLATOR WITH MULTIPLE INITIATORS (75) Inventors: Brent A. Parks, Englewood; Ron J. Butt, Castle Rock; Brian K. Hamilton, Littleton; David W. Struckman, Westminster; Stanley W. Pierce, Denver, all of CO (US)

(73) Assignee: Autoliv ASP Inc., Ogden, UT (US)

( * ) Notice: Under 35 U.S.C. 154(b), the term of this patent shall be extended for 0 days.

(21) Appl. No.: 09/157,742

(22) Filed: Sep. 21, 1998

(51) Int. Cl.[7] ............................. B60R 21/26; B60R 21/32
(52) U.S. Cl. ...................... 280/735; 280/737; 280/741
(58) Field of Search ...................................... 280/737, 736, 280/741, 735

(56) References Cited

U.S. PATENT DOCUMENTS

| 3,672,699 | 6/1972 | Dewindt . | |
|---|---|---|---|
| 3,758,131 | 9/1973 | Stephenson et al. . | |
| 3,767,002 | 10/1973 | Gillund . | |
| 3,767,228 | 10/1973 | Lewis . | |
| 3,773,352 | 11/1973 | Radke . | |
| 3,797,854 | 3/1974 | Poole et al. . | |
| 3,868,126 | 2/1975 | Radke et al. . | |
| 3,901,530 | 8/1975 | Radke . | |
| 3,966,224 | 6/1976 | Campbell et al. | 280/735 |
| 4,136,894 | 1/1979 | Ono et al. | 280/729 |
| 4,243,248 | 1/1981 | Scholz et al. | 280/735 |
| 4,620,721 | 11/1986 | Scholz et al. | 280/735 |
| 4,984,651 | 1/1991 | Grosch et al. | 180/268 |
| 4,998,751 | 3/1991 | Paxton et al. | 280/741 |
| 5,022,674 | 6/1991 | Frantom et al. | 280/741 |
| 5,031,932 | 7/1991 | Frantom et al. | 280/741 |
| 5,033,390 | 7/1991 | Minert et al. | 102/530 |
| 5,071,160 | 12/1991 | White et al. | 280/735 |
| 5,076,607 | 12/1991 | Woods et al. | 280/737 |
| 5,330,226 | 7/1994 | Gentry et al. | 280/735 |
| 5,348,344 | 9/1994 | Blumenthal et al. | 280/737 |
| 5,351,988 | 10/1994 | Bishop et al. | 280/737 |
| 5,470,104 | 11/1995 | Smith et al. | 280/737 |
| 5,558,367 | 9/1996 | Cuevas | 280/737 |
| 5,564,743 | 10/1996 | Marchant | 280/741 |
| 5,685,558 | * 11/1997 | Cuevas | 280/737 |
| 5,803,492 | 9/1998 | Rink et al. | 280/737 |
| 5,863,066 | 1/1999 | Blumenthal | 280/737 |

* cited by examiner

Primary Examiner—Peter C. English
(74) Attorney, Agent, or Firm—Sheridan Ross, P.C.

(57) ABSTRACT

A dual initiator inflator for selective activation, depending upon detection of a low impact vehicle collision or a high impact vehicle collision, is provided for use with an air bag in a vehicle. The inflator can be configured to function at any one of a number of vehicle locations, including a driver side inflator and a passenger side inflator. The inflator includes first and second initiators and first and second propellants. When a low impact vehicle collision is detected, the first initiator is triggered to ignite the first propellant. Essentially all inflation gases that are received in the air bag are due to products of combustion from the first propellant and stored gas contained in the inflator housing. After a predetermined time delay, the second propellant is ignited by the second initiator so that no combustible propellant remains after inflator usage. When a high impact vehicle collision is detected, both first and second propellants are ignited at essentially the same time so that inflation gases received by the air bag are the result of products of combustion from both the first and second propellants, together with the stored gas.

25 Claims, 3 Drawing Sheets

INFLATOR WITH MULTIPLE INITIATORS

This is a related application to U.S. patent application Ser. No. 08/986,255 filed Dec. 5, 1997 and entitled "DUAL INFLATOR APPARATUS INCLUDING PYROTECHNIC INFLATOR."

FIELD OF THE INVENTION

The present invention relates to an inflator with more than one initiator and more than one propellant charge.

BACKGROUND OF THE INVENTION

Inflators are used in vehicles to inflate air bags or other inflatables. The inflatables are intended to protect the occupant when a vehicle collision occurs. In connection with a certain class of inflators, their manner of operation depends upon whether or not the collision involving the vehicle is detected as a high impact or a low impact vehicle collision. The air bag of such an inflator is designed to inflate when a special impact to the vehicle occurs or is exceeded. Different vehicle impacts can occur. A low impact collision typically occurs when the impact vehicle is traveling at a relatively low rate of speed. Relatedly, a low impact collision can occur when an impacting vehicle is traveling at relatively low rate of speed when it strikes the impacted vehicle. Conversely, a high impact collision is characterized by one or both of an impacted and impacting vehicle traveling at a relatively high rate of speed. The pressure developed in the air bag need not be the same for the low and high impact collisions. When a high impact collision occurs, it is desirable to inflate the air bag to a relatively high pressure. With a low impact collision, on the other hand, it is desirable to inflate the air bag to a lesser pressure. Relatedly, depending on the age and/or size of the vehicle occupant, it may be advantageous to control the pressure applied by the air bag. For young or small children, it is usually desirable to utilize less pressure in the air bag than when the vehicle occupant is an adult or larger sized individual.

Inflation systems have been proposed that are intended to take into consideration such factors as the degree of vehicle impact, age, and/or size of the vehicle occupant and/or the position of the occupant in the vehicle. In one prior art system, multiple gas generating units for filling an air bag with gas can be selectively activated. More than one such unit is activated when it is desirable to provide relatively increased pressure in the air bag. In another known prior art system, an electrically controlled vent valve, together with two igniters, are used. The vent valve provides a pathway for gases different from the pathway to inflate the air bag. Based on this configuration, if the electronic controller maintains the vent valve closed and fires each of the two igniters, the air bag inflates with 100% of the gas that is generated. On the other hand, for example, if the vent valve is controlled open and only one of the two igniters is fired, the air bag is inflated with a fraction of the maximum possible gas that could be provided.

Although inflator systems have been previously advanced related to controlling the inflation of an air bag, it would be beneficial to incorporate a relatively less complex arrangement that satisfies the key requirements associated with controlling the inflation of an air bag, including relying on components that are already available or are used in such a system, making as few modifications as is necessary to the air bag module and keeping the addition of parts thereto as few as possible.

SUMMARY OF THE INVENTION

In accordance with the present invention, a multiple initiator inflator is disclosed for use in a vehicle. In one embodiment, a dual initiator inflator is provided in which each of the two initiators is selectively activated in a predetermined way, depending upon whether the vehicle in which the inflator is located is subject to a low impact collision, a high impact collision, or an impact collision between low and high impacts (intermediate impact collision). The inflator can be configured for positioning in the vehicle at any one of a number of vehicle locations. In one embodiment, the inflator is a passenger inflator positioned to inflate an air bag or inflatable that engages the front of the passenger. In another embodiment, the inflator is a driver inflator positioned to inflate an air bag that engages the front of the driver of the vehicle.

The passenger inflator includes an inflator housing for storing a pressurized medium. The pressurized medium or stored gas can include one or more gases and is preferably comprised of oxygen and an inert gas. The inflator housing has first and second ends that are disposed at opposing ends of the length of the inflator housing. At the first end, a first initiator assembly including a first initiator is joined to the inflator housing. A first gas generating assembly is located adjacent to the first initiator assembly. The first gas generating assembly includes a first propellant. When ignited, the first propellant generates products of combustion including propellant gases that, together with the stored gas, are used to fill or pressurize the inflatable. That is, the inflation gases, which are a combination of the products of combustion generated by the ignition of the first propellant and the stored gas, flow to the inflatable and fill it. In that regard, the inflator also includes an outlet assembly through which inflation gases pass into the inflatable. In one embodiment, the outlet assembly is located adjacent to the first initiator assembly and includes a diffuser from which inflation gases are received by the inflatable of the inflatable or air bag module. In this embodiment, the outlet assembly includes a projectile and a closure member or disk. When the inflator is activated and the first initiator is fired, the projectile is caused to move through the closure member thereby rupturing or opening it in order to permit the flow of inflation gases to the diffuser. The first gas generating assembly also has an outlet member having a number of radially spaced holes from which products of combustion including inflation gases generated by ignition of the first propellant are able to escape. Such propellant gases mix with the stored gas and are able to exit the inflator housing after rupturing of the closure member.

At the second or opposite end from the first end, the passenger inflator includes a second initiator assembly comprising a second initiator that is controllably activated, depending upon the occurrence of a low impact, high impact, or other impact (e.g. intermediate) vehicle collision. A second gas generating assembly including a second propellant are disposed adjacent the second initiator assembly. When the second initiator is fired, the second propellant generates products of combustion. Such products of combustion are able to exit the gas generating assembly through an outlet end thereof. This outlet end permits the escape of products of combustion in a direction generally parallel to the length of the inflator housing.

When a high impact collision is detected, both first and second initiators are preferably activated simultaneously or substantially simultaneously (no greater than about 5 msec between their activations). In such a case, propellant gases for pressurizing the air bag are produced by both the first and second propellants, with propellant gases due to the combustion of the first propellant being about 70% of the total propellant gases, and with the propellant gases associated with combustion of the second propellant being the remainder, about 30%. Such propellant gases are combined with the stored gas for exiting the inflator.

When a low impact collision is detected, a control or trigger signal is generated and applied to the first initiator. Upon activation thereof, the first propellant is ignited and inflation gases are subsequently received by the inflatable, which inflation gases are due to the combination of the stored gas and products of combustion from the ignition of the first propellant. The second propellant is not ignited for use in augmenting the inflation gases used to fill the air bag during a low impact event. However, to eliminate the presence of a live or ignitable propellant and/or initiator after activation of the inflator, another control signal is applied to the second initiator after a predetermined time from the triggering of the first initiator. Based on such a delay between the time of firing the first initiator and firing the second initiator, essentially no inflation gases for inflating the air bag are produced as a result of this subsequent activation of the second initiator and the ignition of the second propellant. In one embodiment, the predetermined delay between the two firings is at least about 20 msec. In order to ensure that the products of combustion due to ignition of the first propellant do not ignite the second propellant, the radially located holes at the outlet end of the first gas generating assembly are not aligned or are noncoaxial with the outlet end of the second gas generating assembly. Because of this configuration, the likelihood that the products of combustion from the first propellant will ignite the second propellant through the open end of the second gas generating assembly is virtually eliminated.

When a high impact collision is detected, inflation gases that pressurize the inflatable are provided using propellant gases from both the first and second propellants, together with the stored gas. Each of the first and second initiators is essentially simultaneously activated. The propellant gases due to combustion of the first propellant are greater in volume or amount than the propellant gases due to combustion of the second propellant.

In one embodiment, the driver side inflator includes a toroidal-shaped housing for containing the pressurized medium or stored gas. A gas generating housing is disposed within the toroidal housing. A center axis is defined that passes through the center of the gas generating housing and the center of the toroidal housing. The driver inflator of this embodiment includes a first initiator assembly having a first initiator and a second initiator assembly having a second initiator. The first and second initiators are disposed on opposite sides of the center axis. Each of the two initiators has a center, longitudinal axis. The first initiator assembly includes a first passageway communicating with a first chamber. The first chamber contains a first propellant. Similarly, the second initiator assembly has a second passageway that communicates with a second chamber. The second chamber contains a second propellant. The second chamber is disposed inwardly of the first chamber. A propellant cup separates the two chambers. The propellant cup has an opening through which products of combustion from the second propellant are able to escape. A closure cup is positioned outwardly of at least portions of the propellant cup and covers the propellant cup opening. The first passageway communicates only with the first chamber and not the second chamber. Likewise, the second passageway communicates only with the second chamber and not the first chamber. Each of the first and second passageways is offset from the longitudinal, center axis of their respective first and second initiators. The driver inflator also includes an outlet assembly comprised of a diffuser. The outlet assembly is located at the end of the gas generator housing opposite the end thereof that has the two initiator assemblies. In the preferred embodiment, the outlet assembly includes a closure member or disk that is ruptured or opened due to products of combustion from at least the first propellant.

When a low impact collision is detected, the first initiator is triggered. Communication through the first passageway between the first initiator and the first chamber enables the first propellant to be ignited. Products of combustion are generated including propellant gases that are combined with the stored gas in the toroidal housing for passage to the inflatable as inflation gases. These inflation gases are able to pass through the ruptured closure disk and exit the diffuser to the inflatable thereby pressurizing or filling it. The closure cup acts as a barrier to products of combustion from the first propellant entering the second chamber. Consequently, ignition of the second propellant by products of combustion from the first propellant is avoided. Like the passenger inflator, after a predetermined time delay, the second initiator is triggered to ignite the second propellant in the second chamber thereby eliminating a live or potentially combustible second propellant and/or second initiator after the inflator has been utilized in connection with detection of a low impact collision. Alternatively, when a high impact collision is detected, each of the two initiators is activated at the same time, or substantially at the same time, so that both first and second propellants are ignited to generate propellant gases. Including the stored gas, greater volumes of inflation gases are thereby produced as a result of activation of both initiators at the same time to thereby provide a greater pressure in the inflatable.

Each of the inflators, including passenger and driver inflators, can be differently controlled for vehicle collisions that occur and are definable as being between a relatively low impact collision and a relatively high impact collision. For such intermediate impact vehicle collisions, the second initiator is activated at a desired or determined time after activation of the first initiator. Depending on one or more of a number of factors, such as severity of the collision (greater than low impact but less than high impact) and the size and/or location of the vehicle occupant, the second initiator is controllably activated to generate additional propellant gases for pressurizing the air bag and affect the air bag inflation curve (pressure in air bag vs. time). A relatively less delay in activating the second initiator after activation of the first initiator results in relatively more rapid pressurization of the air bag, in comparison with a longer time delay between activation of the first initiator and activation of the second initiator. As can be appreciated, each dual initiator inflator can therefore be controlled or tuned to provide a desired inflation curve.

Based on the foregoing summary, a number of important advantages of the present invention are readily seen. An inflator is provided that is responsive to degrees or levels of vehicle impact. For a relatively low vehicle collision or impact, less pressure is developed in the air bag since there is a lower requirement for pressurization. Conversely, upon detection of a relatively higher impact vehicle collision, the air bag is supplied with more inflation gases to achieve a higher pressurization. The inflator is configured such that, when a low impact vehicle event is detected, the high impact propellant is not ignited due to products of combustion that are generated by the low impact propellant. Even when only a low impact collision is detected, there is controlled activation of the high impact propellant after a predetermined delay in order to eliminate the presence of live or combustible propellant and initiator after inflator usage. The dual initiator inflator of the present invention can be configured for a number of different positions in the vehicle including passenger and driver side inflators. The inflator designs are compact including desired or optimum arrangements of the initiator assemblies and the propellants. The gas generating assemblies or housings are composed of non-frangible parts so that, when the inflator is activated due to a high impact event being detected, no rupturing of the housings or chambers containing the high impact propellant is required.

Additional advantages of the present invention will become readily apparent from the following discussion, particularly when taken together with the accompanying drawing figures.

DETAILED DESCRIPTION

Figure 1:
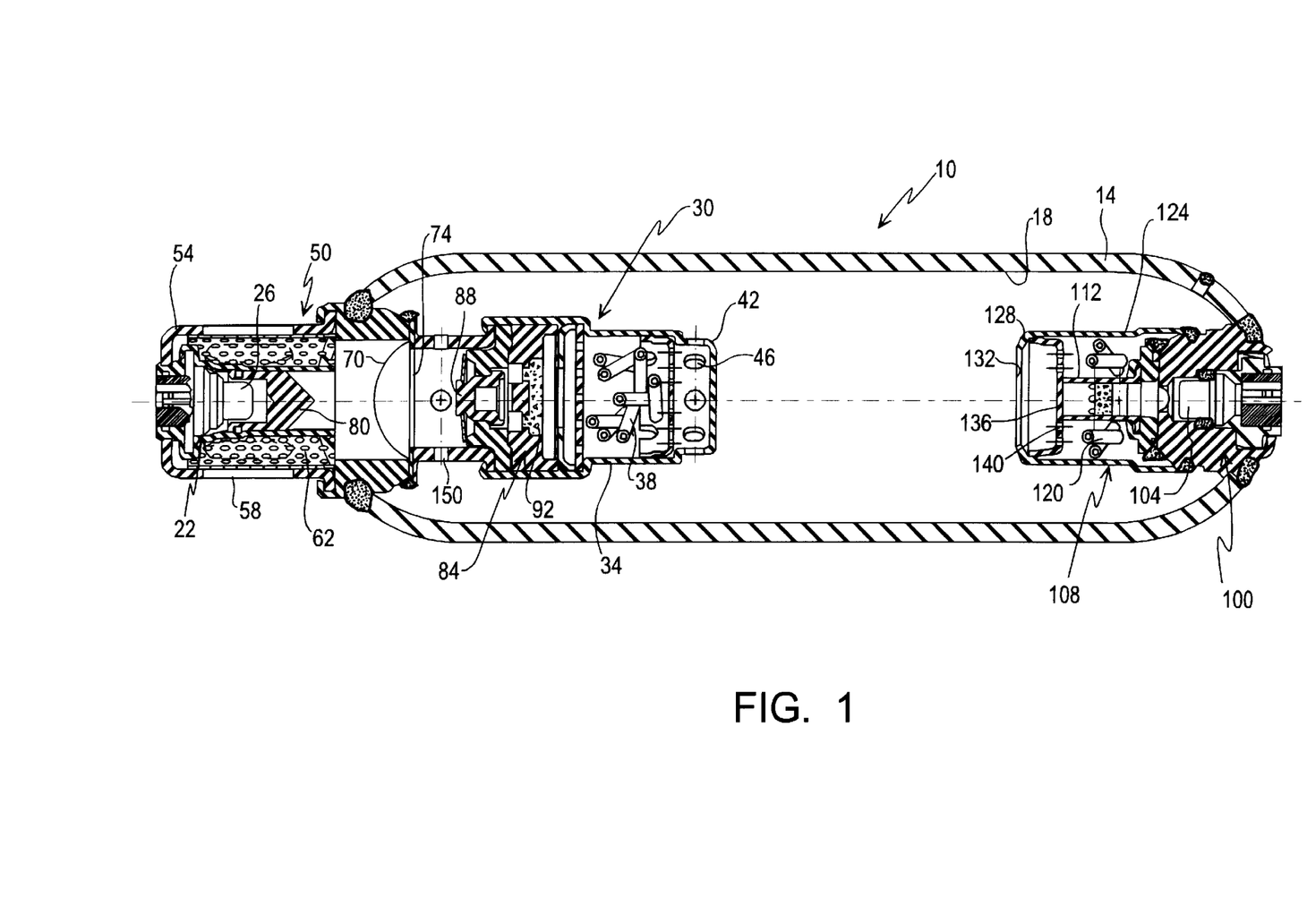
FIG. 1 is a longitudinal, cross-sectional view of a passenger inflator illustrating the first and second initiator assemblies and the first and second gas generating assemblies located at opposite ends of the inflator housing.

With reference to FIG. 1, a dual initiator passenger inflator 10 is illustrated. The inflator 10 includes an inflator housing 14 having a volume or chamber 18. The volume 18 stores a pressurized medium that can be comprised of a number of gases, preferably, oxygen and an inert gas, such as argon. The stored gas is used, when the inflator 10 is activated, for pressurizing or filling an air bag or inflatable located in the vehicle.

The dual initiator inflator is characterized by having two initiator assemblies, two gas generating assemblies, and two gas generating materials or propellants (propellant charges), with one set of each of these being found at opposite ends of the inflator housing 14.

Figure 3:
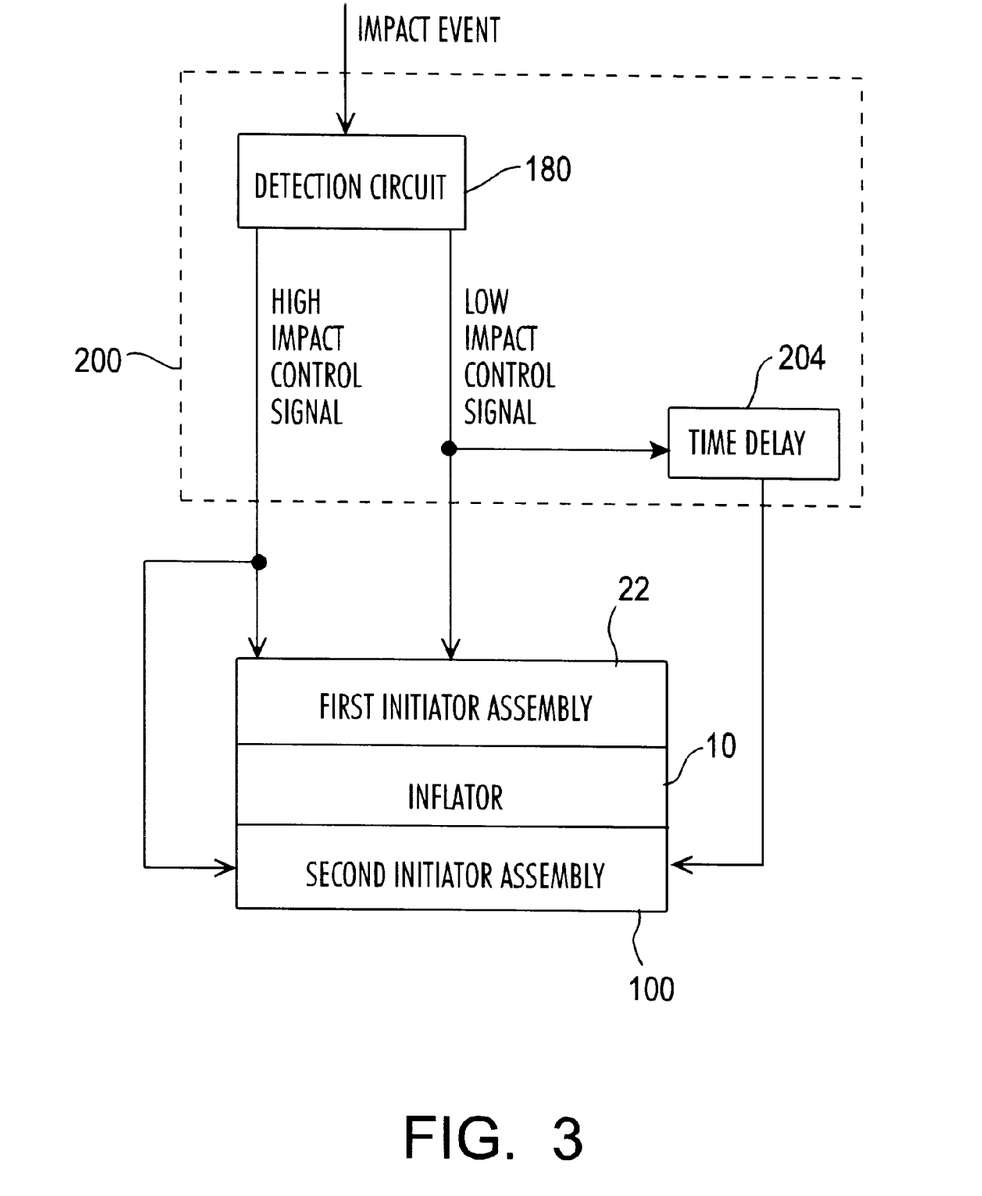
FIG. 3 is a block diagram illustrating a control system for controlling activation of two initiator assemblies of an inflator.

With continued reference to FIG. 1, a first initiator assembly 22 is joined to a first end of the inflator housing 14. The first initiator assembly 22 includes a first initiator 26 having one or more electrical conductive pins that are connectable to one or more conductive wires. A control or initiation signal is applied to one of the conductive pins of the first initiator 26 in order to activate or fire it. With reference to FIG. 3 also, a low impact control signal is generated when a vehicle impact or collision is detected having a desired or predetermined threshold. In this preferred embodiment, the first initiator 26 is activated when a low impact vehicle collision or event is detected by a detection circuit 180 of a control system 200. This circuit 180 generates the low impact control signal based on such detection for sending the low impact control signal along the conductive wire to the pin of the first initiator 26 of the first initiator assembly 22. Detection of a low-impact collision is well established and generating a signal indicative thereof is well-known to those of skill in the art.

Also adjacent to this first end of the inflator 10, but located within the volume 18 thereof, is a first gas generating assembly 30. The first gas generating assembly 30 includes a first housing 34 that contains or otherwise stores a first propellant or gas generating material 38. The first propellant 38 is combustible so that, when ignited upon activation of the first initiator 26, generates products of combustion including propellant gases. Such propellant gases mix or combine with the pressurized medium in the volume 18 to fill the inflatable with inflation gases. The gas generating assembly 30 also has an outlet member 42 having a number of radially spaced holes 46 through which products of combustion, particularly propellant gases exit into the volume 18.

The dual initiator inflator 10 also includes an outlet assembly 50 located at the first end thereof. The outlet assembly 50 includes a diffuser 54 having one or more openings 58 that are in fluid communication with the air bag or inflatable. The outlet assembly 50 surrounds the initiator assembly 22 and also includes a screen 62 that prevents unwanted particles of a predetermined size and greater from escaping the outlet assembly 50 through the opening or openings 58 in the diffuser.

Disposed between the first initiator assembly 22 and the first gas generating assembly 30 is a closure member or disk 70 and a filler washer 74. The closure member 70 and the filler washer 74 are located within the volume 18 of the inflator housing 14. Positioned between the closure member 70 and the first initiator assembly 22 is a projectile 80, which is used to break or rupture the closure member 70. When the first initiator 26 is activated or fired, the force produced by its activation causes the projectile 80 to move along a path to and through the closure member 70, thereby rupturing it and providing an opening for fluid communication between the volume 18 and the diffuser 54.

In this embodiment, the gas generating assembly 30 also includes an ignition assembly 84 located between the first propellant 38 and the filler washer 74. The ignition assembly 84 includes a piston 88 that is movable in a direction toward the propellant 38 for igniting a booster 92. When the booster 92 is caused to combust, this, in turn, ignites the first propellant 38.

With reference to the second or opposite end of the inflator housing 14, a second initiator assembly 100 is connected or otherwise held to the inflator housing 14. Unlike the first initiator assembly 22, the second initiator assembly 100 is located inwardly of the inflator housing 14 wall. The second initiator assembly 100 includes a second initiator 104. The first and second initiators 26, 104 can be the same. Regardless, the second initiator 104 also has one or more conductive pins and in which at least one conductive pin of the second initiator 104 receives a control or initiation signal under predetermined conditions. This control signal to the conductive pin of the second initiator 104 can be the same control signal that is applied to the conductive pin of the first initiator 26 or, alternatively, such a control signal may be different in magnitude and time when it is received by the conductive pin and causes the activation of the second initiator 104. More specifically, in the preferred embodiment, when a high impact vehicle event or collision is detected, a high impact control or initiation signal is applied to the second initiator 104 conductive pin. The high impact event is associated with a greater threshold than the low impact event. This threshold relates to the magnitude or severity of the impact that the vehicle is subjected to or otherwise experiences, which is detected and causes the generation of the high impact control signal. A further discussion related to activation of the second initiator 104 will be provided in the context of the description of operation of the dual initiator inflator 10 herein.

A second gas generating assembly 108 is operably joined to the second initiator assembly 100 and is located further inwardly of the inflator housing 14 wall. The second gas generating assembly 108 includes a transfer tube 112 coaxially aligned with the second initiator 104. A second propellant or gas generating material 120 is contained concentrically outwardly of the transfer tube 112 and within the second housing 124 of the second gas generating assembly 108. The second housing 124 has an outlet end 128 having an opening 132. An injector member 136 is positioned adjacent the free end of the transfer tube 112 and has a number of injector ports 140 through which products of combustion, particularly inflation gases, pass due to the ignition of the second propellant 120.

With respect to the operation of the passenger dual initiator inflator 10, assume first that a low impact vehicle collision is detected. A low impact control signal indicative of the detection of the low impact collision is generated and applied to the conductive pin of the first initiator 26 of the first initiator assembly 22. Activation of the first initiator 26 provides sufficient force to cause the projectile 80 to move through the closure disk 70 and create an opening therein, as well as to engage the actuation piston 88 causing it to move and subsequently result in firing of the booster material 92 that ignites the first propellant 38, which ignition generates products of combustion from the first propellant 38 including propellant gases. These gases exit the radially spaced holes 46 in the outlet member 42. Such gases mix with the pressurized medium or stored gas. These inflation gases are able to escape from the inflator housing 14 through ports 150 which are adjacent to the closure member 70, and then through the opening created in the closure member 70. The inflation gases continue through the apertures in the screen 62 and then through the outlet holes 58 in the diffuser 54. The inflation gases that exit the outlet assembly 50 fill the air bag or other inflatable to which the inflator 10 is operatively connected.

The amount of the propellant 38 and, concomitantly, pressurized medium, are configured or tuned to provide a desired pressurization in the inflatable that, on a relative scale, is less due to the detected lower vehicle impact. In accordance with this invention, after the inflator 10 has been activated and the first propellant 38 ignited, an objective is to eliminate the live and combustible second propellant 120 and/or the second initiator 104. Even though the second propellant 120 is essentially not used in providing propellant gases, or contributing to the inflation gases, for filling the air bag when a low impact event is detected, the second propellant 120 is controllably ignited to eliminate the presence of this combustible material after inflator activation due to detection of a low impact collision. In particular, after a predetermined time interval or delay as represented by the time delay 204 of FIG. 3, beginning with the activation or firing of the first initiator 26, a low impact control signal, at least different in time of application from that applied to the first initiator 26, is applied to the conductive pin of the second initiator 104 of the second initiator assembly 100. This activation ignites the second propellant 120 to generate second propellant products of combustion. Since all, or virtually all, of the pressurized medium has already been utilized to pressurize the air bag, there is no stored gas to be expanded using the products of combustion from the second propellant 120. Consequently, little, if any, inflation gases pass into the air bag due to the activation of the second propellant 120. Regardless, the second propellant 120 is caused to combust and no live or combustible propellant remains in the inflator 10 and, by activation of the second initiator 104, no active initiator remains in the inflator 10. With regard to the predetermined time interval or delay, in one embodiment, such a time delay should be at least about 20 milliseconds and, preferably for the passenger inflator greater than about 100 milliseconds. In one embodiment, such a delay does not exceed 500 milliseconds, but could be substantially greater than 500 msec.

A different operation occurs when a high impact vehicle event or collision is detected. In particular, when such is detected using the detection circuit 180, a high impact control signal, which can be the same control signal, is applied simultaneously or substantially simultaneously to each of the first and second initiators 26, 104 of the first and second initiator assemblies 22, 100, respectively. As a result, both first and second propellants 38, 120 meaningfully contribute to generation of propellant gases that pass from the outlet assembly 50 and pressurize the air bag. In one embodiment, the amounts and compositions of the propellants 38, 120, in conjunction with the design of the inflator 10, result in the first propellant 38 providing a relative contribution of about 70% of such propellant gases, while the second propellant 120 provides a relative contribution of the remaining about 30% of the propellant gases to the air bag.

In connection with the exiting of propellant gases from the second gas generating assembly 108, due to the location of the outlet opening 132, such propellant gases generally escape the outlet end 128 of the second gas generating assembly 108 in a direction parallel or substantially parallel to the length of the inflator housing 14. Contrastingly, the propellant gases from the outlet member 42 of the first gas generating assembly 30 exit the holes 46 in a radial path, different from parallel or substantially parallel to the length of the housing 14. This escape path for propellant gases from the first gas generating assembly 30 is particularly advantageous when the inflator 10 is activated due to detection of a low impact event. When such occurs and a second propellant 120 is not to be ignited, until after a predetermined time delay, it is important that activation of the first propellant 38 not cause combustion of the second propellant 120. Since products of combustion from the first propellant 38 are not directed along a path toward the outlet opening 132 for possible communication with the second propellant 120, there is an even more substantial likelihood that combustion of the first propellant 38 will not result in unwanted ignition of the second propellant 120.

With regard to even more information regarding the first and second propellants 38, 120, including their compositions, which can be the same, together with the pressurized medium including its composition or compositions and the hardware design aspects of the inflator components, reference is made to the contents of U.S. Pat, No. 5,788,275 issued Aug. 4, 1998 entitled "HYBRID INFLATOR", and assigned to the same assignee as the present application. In particular, reference is made to FIGS. 1–4, and column 4, line 44 through column 19, line 65, which are hereby incorporated by reference.

Figure 2:
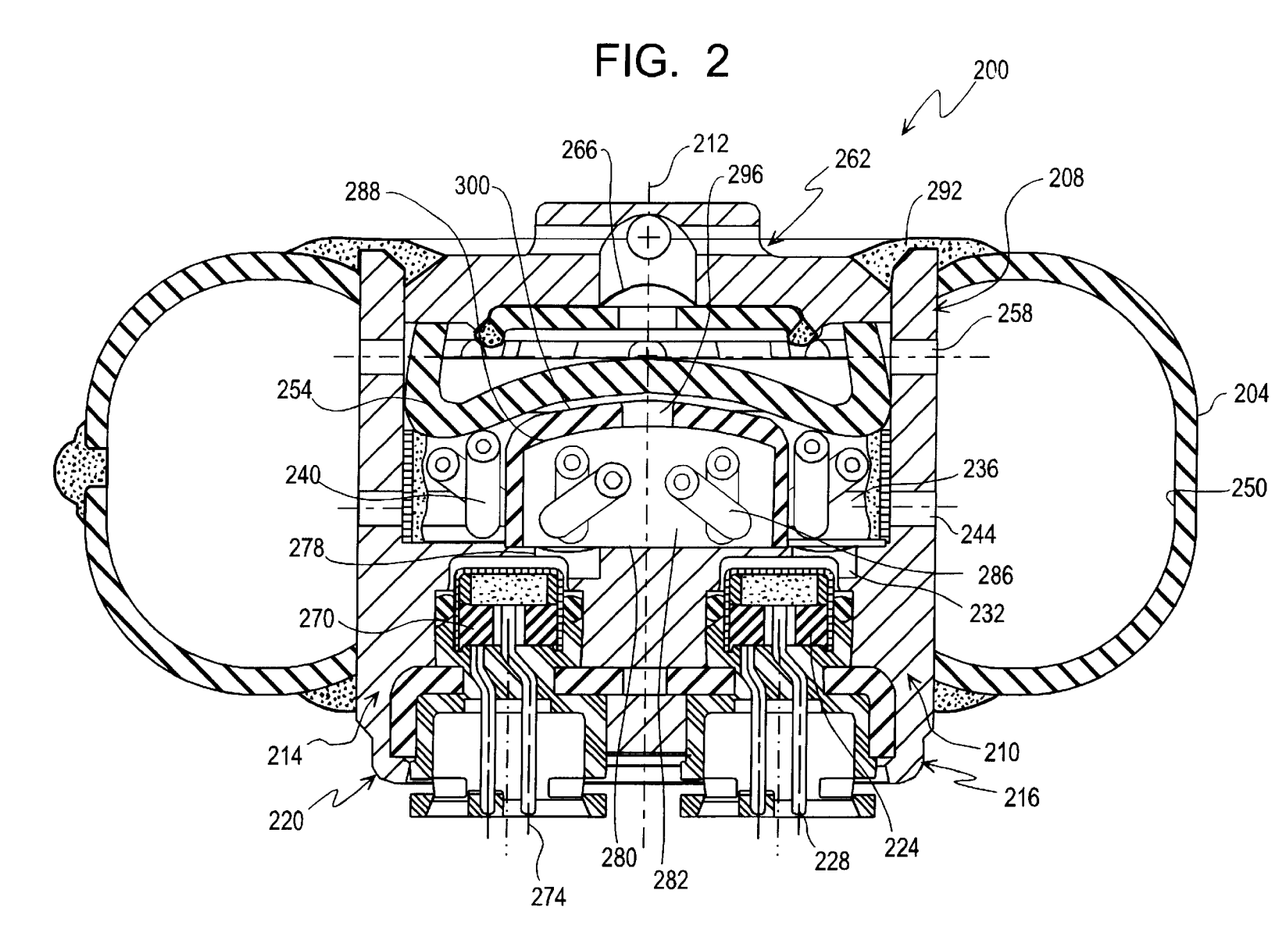
FIG. 2 is a side elevational, cross-sectional view of a driver inflator illustrating the dual initiators, particularly their arrangements and communications relative to other parts of the inflator.

With reference now to FIG. 2, a dual initiator driver inflator 200 is illustrated. The inflator 200 includes an inflator housing 204 having a substantially toroidal shape. A dual gas generating assembly 208 is positioned within the inflator housing 204 and has a center axis 212 located through the center of the dual gas generating assembly 208. The dual gas generating assembly 208 includes a first gas generating assembly 210 and a second gas generating assembly 214. At a first end of the gas generating assembly 208 are first and second initiator assemblies 216, 220 of the first and second gas generating assemblies 210, 214, respectively. The first initiator assembly 216 includes a first initiator 224 having a coaxial conductive pin 228. The conductive pin 228 is connectable to an electrically conductive wire that communicates with an output for providing a control signal indicative of a predetermined vehicle collision or event. Similar to the passenger dual initiation inflator 10, the first initiator 224 is triggered when a vehicle low impact event or collision is detected. In that regard, the first initiator assembly 216 includes a passageway 232 that communicates with a first chamber 236 in the gas generating assembly 208. The first chamber 236 contains a first propellant 240 that is ignited when the first initiator 224 is fired. The first passageway 232 provides a path from the first initiator 224 in order to ignite the first propellant 240. Upon ignition, products of combustion including propellant gases are generated that pass through one or more inlet ports 244 into the volume or chamber 250 of the inflator housing 204. Such volume 250 of the inflator housing 204 stores a pressurized medium that combines with the propellant gases produced by the combustion of the propellant 240 to provide inflation gases to the air bag. The gas generating assembly 208 includes an afterburner member 254 that is used in causing inflation gases generated by the ignition of the propellant 240, together with the stored gas in the inflator housing 204, to pass from the volume 250 through one or more ports 258 for passage to the outlet assembly 262. A closure member or disk 266 is caused to open or rupture by means of the force of the inflation gases applied thereto when the inflator 200 is activated.

The second initiator assembly 220 is disposed on the opposite side of the center axis 212 from the first initiator assembly 216. The second initiator assembly 220 includes a second initiator 270 and two conductive pins associated with triggering the second initiator 270 including a coaxial conductive pin 274. The second initiator assembly 220 also has second passageway 278 that provides communication between the second initiator 270 and a second chamber 282. The second chamber 282 contains or stores a second propellant 286 that is combustible upon activation of the second initiator 270 through the passageway 278. The second chamber 282 of the gas generating assembly 208 is defined or formed by a propellant cup 288 having a top 292 with an opening 296. A thin closure cup 300 covers the opening 296 and extends about or over at least some portions of the outer surface of the propellant cup 288 including the top 292 thereof.

The closure cup 300 acts as a check valve. Specifically, when the first propellant 240 is ignited and produces products of combustion, such products of combustion cannot pass through the opening 296 in the propellant cup 288 because it is blocked by the closure cup 300, with such products of combustion essentially forcing or holding the closure cup 300 over the opening 296 so that no products of combustion from the first propellant 240 are able to enter therethrough into the second chamber 282. Contrastingly, when the second propellant 240 is ignited, products of combustion therefrom are of sufficient force to move or raise the closure cup 300 away from the opening 296 to enable products of combustion to pass from the second chamber 282 into the first chamber 236.

It is also noted that the second passageway 278 communicates entirely inwardly of the propellant cup 288 and does not communicate with the first chamber 236 so that activation of the second initiator 270 does not cause ignition of the second propellant 240. Likewise, the first passageway 232 communicates with the first chamber 236, but does not communicate with the second chamber 282 so that activation of the first initiator 224 does not cause ignition of the propellant 240 in the first chamber 236. It is also noted that both first and second passageways 232, 278 are offset from the respective longitudinal, center axis of the first and second initiators 224, 270, which is advantageous in providing a compact design in a driver inflator 200 having the dual initiators 224, 270.

In a preferred embodiment, portions of the passageways 232, 278 are pre-formed through a chamber floor. The passageways 232, 278 are completed by openings that are created when the initiators 224, 270, respectively, are triggered. That is, a chamber closure member 280 is joined to the chamber floor, preferably by brazing, to cover over and hermetically seal both first and second chamber 236, 282. In addition to sealing the two chambers 236, 282, the chamber closure member 280 is also brazed at the same time to the bottom of the propellant cup 288 in order to properly hold and locate it and thereby define the first and second chambers 236, 282. The chamber closure member 280 is made of a relatively thin material such that, when the first initiator 224 is activated, an opening in alignment with portions of the passageway 232 is made, while substantially all other portions of the chamber closure member 280 remain substantially in place and not opened or breached. Similarly, when the second initiator 270 is activated, an opening in alignment with the passageway portions of the resulting second passageway 278 is made, while substantially all other portions of the chamber closure member 280 remain substantially in place or not opened or breached. Hence, the chamber closure member 280 provides a number of functions that are accomplished by brazing it to the chamber floor, namely: providing a hermetic seal in connection with covering the passageways 232, 278 that are completely opened when their respective initiators 224, 270 are fired, together with the desired connection of the propellant cup 288 to the chamber floor.

With respect to the operation of the dual initiation driver inflator 200, assume that a low impact vehicle collision is detected thereby resulting in the application of a low impact control signal to the conductive pin 228 of the first initiator 224. This low impact control signal fires the initiator 224, of the first initiator assembly 216 which causes desired igniting gases or materials to pass through the first passageway 232 into the first chamber 236 and ignite the first propellant 240 therein. Ignition of the first propellant 240 generates products of combustion including propellant gases that pass through the inlet port(s) 244 into the toroidal housing 204 where such inflation gases mix with the stored gas. Such a combination of inflation gases exit the toroidal housing through the outlet port(s) 258 and are able to rupture the closure member 266 and escape through the outlet assembly 262 into the air bag.

During activation of the inflator 200 due to detection of a low impact event, the second initiator 270 is not fired when the first initiator 224 is triggered. However, like the passenger dual initiation inflator 10, after a predetermined time interval or delay, the second initiator 270 is also activated. Such activation results in ignition of the second propellant 286 in order to eliminate the presence of any combustible or live propellant 286, as well as the second initiator 270, after activation of the inflator 200 due to the low impact collision or event. Such a predetermined time delay is at least about 20 msec.

When a high impact vehicle collision is detected, a high impact control signal, which can be the same control signal, is applied at the same time, or substantially the same time, to pin 228 of the first initiator 224 of the first initiator assembly 216 and the pin 274 of the second initiator 270 of the second initiator assembly 220. The high impact control signal or signals activate each of the two initiators 224, 270, which results in combustion of the first and second propellants 240, 286. Propellant gases generated thereby combine with the pressurized medium in the volume 250 of the toroidal housing 204 to provide inflation gases that pressurize the air bag or inflatable in communication with the inflator 200. Such pressurization is greater than that in the air bag when a low impact vehicle collision is detected. Such a greater pressurization is applied during at least a majority of the time that the air bag is being inflated.

Like the passenger dual initiation inflator 10, more information concerning the propellants and the pressurized medium can be found in the designated parts of the aforenoted U.S. patent, as well as the contents of the same patent beginning at col. 48, line 7 and continuing through col. 51, line 27, which describes inflator hardware having similarities to that of FIG. 2, and which are also hereby incorporated by reference.

Each of the embodiments of multiple initiator inflators including those specifically described herein can also be controllably activated when an intermediate impact vehicle collision or event occurs. Such an intermediate vehicle collision relates to the severity of a vehicle collision between a relatively low impact collision and a relatively high impact collision. In connection with being responsive to such vehicle collisions, the second initiator of the dual initiator inflator as disclosed herein can be triggered at any one of a number of different times. The less the delay between the firing of the first initiator and the firing of the second initiator results in relatively more rapid pressurization of the air bag, as part of the propellant gases being generated by the second propellant contributing more of the inflation gases to the air bag, in comparison with triggering the second initiator after a relatively greater delay between activation of the first and second initiators. For example, when both first and second propellants are essentially activated at the same time and the first propellant gases constitute 70% and the second propellant gases constitute 30% of the total propellant gases, the percentage of second propellant gases that contribute to the inflation gases which pressurize the air bag, decreases as the time interval between activation of the first and second initiators increases. In one embodiment, this predetermined time interval associated with responding to intermediate vehicle collisions is between about 5 msec and about 20 msec.

The foregoing description of the invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes of practicing the invention and to enable others skilled in the art to utilize the invention in such, or other embodiments, and with the various modifications required by the particular applications or uses of the invention. It is intended that the appended claims be construed to include alternative embodiments to the extent permitted by the prior art.

What is claimed is:

1. A dual initiator inflator for providing inflation gas to an inflatable located in a vehicle, comprising:

an inflator housing for storing a pressurized medium;

a first gas generating assembly including a first propellant that generates products of combustion including a first propellant gas;

a first initiator assembly for initiating ignition of said first propellant;

a second gas generating assembly including a second propellant that generates products of combustion including a second propellant gas;

a second initiator assembly for initiating ignition of said second propellant;

an outlet assembly through which inflation gas, which includes at least one of the first propellant gas and the second propellant gas, passes into the inflatable in the vehicle; and a control system operatively associated with said first and second initiator assemblies for controlling activation thereof:

wherein, when the vehicle is subject to a low impact event, said first initiator assembly is activated using said control system and the inflatable is inflated using inflation gas to a first pressure and, after a delay beginning with activation of said first initiator assembly, said second initiator assembly is activated using said control system, with substantially all of the propellant gas that passes to the inflatable being generated by said first propellant and substantially no propellant gas is received in the inflatable from said second propellant when said low impact event is detected and, when the vehicle is subject to a high impact event, said first initiator assembly and said second initiator assembly are activated substantially at the same time and the inflatable is inflated using inflation gas that includes both the first propellant gas and the second propellant gas to a second pressure, with said second pressure being greater than said first pressure.

2. An inflator, as claimed in claim 1, wherein:

said delay is greater than about 100 msec.

3. An inflator, as claimed in claim 1, wherein:

said second gas generating assembly includes a second gas generating housing having an open end through which products of combustion from said second propellant exit said second gas generating housing when said second propellant is ignited and in which said first gas generating assembly includes a first gas generating housing having an outlet member with holes through which propellant gases generated by said first propellant exit said first gas generating housing, with said holes being non-coaxial with said open end of said second gas generating housing.

4. An inflator, as claimed in claim 3, wherein:

said holes are radially positioned on said outlet member of said first gas generating housing.

5. An inflator, as claimed in claim 3, wherein:

said second gas generating assembly includes an injector member having ports through which propellant gases pass when said second propellant is ignited and in which said injector member is disposed between said open end and said second propellant.

6. An inflator, as claimed in claim 1, wherein:

said first initiator assembly includes a first initiator and a first passageway and said first gas generating assembly includes a first chamber that contains said first propellant and a chamber closure member that has a first portion which opens when said first initiator is activated so that said first passageway communicates with said first chamber.

7. An inflator, as claimed in claim 1, wherein:

at least one of said first and second gas generating assemblies includes a chamber closure member and said second gas generating assembly includes a propellant cup and in which said chamber closure member is joined to a bottom of said propellant cup.

8. A dual initiator inflator for providing inflation gas to an inflatable located in a vehicle, comprising:

an inflator housing for storing a pressurized medium;

a first gas generating assembly including a first propellant that generates products of combustion including a first propellant gas;

a first initiator assembly for initiating ignition of said first propellant, said first initiator assembly including a first initiator and a first passageway, said first gas generating assembly including a first chamber that contains said first propellant and in which said first passageway communicates with said first chamber when said first initiator is activated, and with the inflator having a center axis spaced from said first initiator and said first initiator having a longitudinal, center axis and with said first passageway spaced laterally from said longitudinal, center axis of said first initiator;

a second gas generating assembly including a second propellant that generates products of combustion including a second propellant gas;

a second initiator assembly for initiating ignition of said second propellant;

an outlet assembly through which inflation gas, which includes at least one of the first propellant gas and the second propellant gas, passes into the inflatable in the vehicle; and a control system operatively associated with said first and second initiator assemblies for controlling activation thereof:

wherein, when the vehicle is subject to a low impact event, said first initiator assembly is activated using said control system and, after a delay beginning with activation of said first initiator assembly, said second initiator assembly is activated using said control system.

9. An inflator, as claimed in claim 8, wherein:

said second initiator assembly includes a second initiator and a second passageway, said second gas generating assembly includes a second chamber that contains said second propellant and in which said second passageway communicates with said second chamber when said second initiator is activated, and with said second initiator having a longitudinal, center axis and with said second passageway spaced laterally from said longitudinal, center axis of said second initiator.

10. A dual initiator inflator for providing inflation gas to an inflatable located in a vehicle, comprising:

an inflator housing for storing a pressurized medium;

a first gas generating assembly including a first propellant that generates products of combustion including a first propellant gas;

a first initiator assembly for initiating ignition of said first propellant, said first initiator assembly including a first initiator and a first passageway and said first gas generating assembly including a first chamber that contains said first propellant and a chamber closure member that has a first portion which opens when said first initiator is activated so that said first passageway communicates with said first chamber;

a second gas generating assembly including a second propellant that generates products of combustion including a second propellant gas;

a second initiator assembly for initiating ignition of said second propellant, said second initiator assembly including a second initiator and a second passageway, said second gas generating assembly including a second chamber that contains said second propellant and in which said chamber closure member has a second portion that opens when said second initiator is activated so that said second passageway communicates with said second chamber;

an outlet assembly through which inflation gas, which includes at least one of the first propellant gas and the second propellant gas, passes into the inflatable in the vehicle; and a control system operatively associated with said first and second initiator assemblies for controlling activation thereof;

wherein, when the vehicle is subject to a low impact event, said first initiator is activated using said control system and, after a delay beginning with activation of said first initiator, said second initiator is activated using said control system.

11. An inflator, as claimed in claim 10, wherein:

said second gas generating assembly includes a propellant cup in which said second propellant is contained and in which said chamber closure member is joined to said propellant cup.

12. A dual initiator inflator for providing inflation gas to an inflatable located in a vehicle, comprising:

an inflator housing for storing a pressurized medium;

a first gas generating assembly including a first propellant that generates products of combustion including a first propellant gas;

a first initiator assembly for initiating ignition of said first propellant;

a second gas generating assembly including a second propellant that generates products of combustion including a second propellant gas, at least one of said first and second gas generating assemblies including a chamber closure member and said second gas generating assembly including a propellant cup and in which said chamber closure member is joined to a bottom of said propellant cup;

a second initiator assembly for initiating ignition of said second propellant;

an outlet assembly through which inflation gas, which includes at least one of the first propellant gas and the second propellant gas, passes into the inflatable in the vehicle; and a control system operatively associated with said first and second initiator assemblies for controlling activation thereof;

wherein said first initiator assembly including a first passageway and said second initiator assembly includes a second passageway and in which said chamber closure member covers said first and second passageways and, when the vehicle is subject to a low impact event, said first initiator assembly is activated using said control system and, after a delay beginning with activation of said first initiator assembly, said second initiator assembly is activated using said control system.

13. A dual initiator inflator for providing inflation gas to an inflatable located in a vehicle, comprising:

an inflator housing for storing a pressurized medium;

a first gas generating assembly including a first propellant that generates products of combustion including a first propellant gas;

a first initiator assembly for initiating ignition of said first propellant;

a second gas generating assembly including a second propellant that generates products of combustion including a second propellant gas, said second gas generating assembly including a propellant cup in which said second propellant is contained and a closure cup disposed outwardly of said propellant cup and in which said closure cup prevents products of combustion from entering into said propellant cup which said first propellant is ignited and said second propellant is not ignited;

a second initiator assembly for initiating ignition of said second propellant;

an outlet assembly through which inflation gas, which includes at least one of the first propellant gas and the second propellant gas, passes into the inflatable in the vehicle; and a control system operatively associated with aid first and second initiator assemblies for controlling activation thereof;

wherein, when the vehicle is subject to a low impact event, said first initiator assembly is activated using said control system and, after a delay beginning with activation of said first initiator assembly, said second initiator assembly is activated using said control system.

14. A dual initiator inflator for providing inflation gas to an inflatable located in a vehicle comprising:

an inflator housing for storing a pressurized medium;

a first gas generating assembly including a first propellant that generates products of combustion including a first propellant gas;

a first initiator assembly for initiating ignition of said first propellant;

a second gas generating assembly including a second propellant that generates products of combustion including a second propellant gas, said second gas generating assembly including a propellant cup in which said second propellant is contained and a closure cup disposed outwardly of said propellant cup and in which said closure cup is movable relative to said propellant cup when products of combustion are generated due to ignition of said second propellant;

second initiator assembly for initiating ignition of said second propellant;

an outlet assembly through which inflation gas, which includes at least one of the first propellant gas and the second propellant gas, passes into the inflatable in the vehicle; and a control system operatively associated with said first and second initiator assemblies for controlling activation thereof:

wherein, when the vehicle is subject to a low impact event, said first initiator assembly is activated using said control system and, after a delay beginning with activation of said first initiator assembly, said second initiator assembly is activated using said control system.

15. An inflator, as claimed in claim 14, wherein:

said propellant cup includes an opening that underlies portions of said closure cup.

16. A method for inflating an inflatable in a vehicle using an inflator and a control system, comprising:

detecting an impact event to which the vehicle is subjected using said control system, said impact event including at least one of a low impact event and a high impact event, when a low impact event is detected the inflatable is inflated to a first pressure and when a high impact event is detected the inflatable is inflated to a second pressure, with said second pressure being greater than said first pressure;

igniting firstly a first propellant using a first initiator when said low impact event is detected;

generating a first propellant gas using said first propellant when said low impact event is detected;

receiving said first propellant gas in the inflatable when said low impact event is detected;

delaying for a time interval after said igniting firstly step when said low impact event is detected;

igniting secondly a second propellant using a second initiator after said delaying step when said low impact is detected, wherein products of combustion are generated from said second propellant due to said igniting secondly step and in which substantially all the propellant gas received in the inflatable is from said first propellant and substantially no propellant gas is received in the inflatable from said second propellant;

igniting said first propellant and said second propellant at substantially the same time using said first initiator and said second initiator, respectively, when said high impact event is detected;

generating said first propellant gas and a second propellant gas using said first and second propellants, respectively when said high impact event is detected; and receiving said first a second propellant gases in the inflatable when said high impact event is detected.

17. A method, as claimed in claim 16, wherein:

said time interval is greater than about 100 msec.

18. A method, as claimed in claim 16, wherein:

said step of generating said first propellant gas using said first propellant when a low impact event is detected includes outputting said first propellant gas radially from an outlet member of a first gas generating assembly that includes said first propellant.

19. A method, as claimed in claim 16, wherein:

said step of generating said first propellant gas and said second propellant gas when said high impact event is detected includes outputting products of combustion front an open end of a second gas generating assembly that includes said second propellant and in which said open end was open before said step of igniting said first and second propellants at substantially the same time.

20. A method, as claimed in claim 16, wherein:

said step of generating said first propellant gas using said first propellant when said low impact event is detected includes generating said first propellant gas in a first chamber containing said first propellant while propellant gas is not generated in a second chamber containing said second propellant and in which said second chamber is inwardly located relative to said first chamber.

21. A method, as claimed in claim 16, wherein:

each of said first and second initiators is offset from a center axis of the inflator.

22. A method for inflating an inflatable in a vehicle using an inflator and a control system, comprising:

detecting a low impact event to which the vehicle is subjected using said control system;

igniting firstly a first propellant using a first initiator, said igniting firstly step including using a first passageway between said first initiator and a first chamber to cause said first propellant located in said first chamber to ignite upon activation of said first initiator, said first passageway being offset from a longitudinal, center axis of said first initiator;

generating a first propellant gas using said first propellant;

receiving said first propellant gas in the inflatable;

delaying for a time interval after said igniting firstly step; and igniting secondly a second propellant using a second initiator after said delaying step.

23. A method for inflating an inflatable in a vehicle using an inflator and a control system, comprising:

detecting a low impact event to which the vehicle is subjected using said control system;

igniting firstly a first propellant using a first initiator;

generating a first propellant gas using said first propellant;

receiving said first propellant gas in the inflatable;

delaying for a time interval after said igniting firstly step; and igniting secondly a second propellant using a second initiator after said delaying step, said igniting secondly step including using a second passageway between said second initiator and a second chamber to cause said second propellant in said second chamber to ignite upon activation of said second initiator, said second passageway being offset from a longitudinal, center axis of said second initiator.

24. A method for inflating au inflatable in a vehicle using an inflator and a control system, comprising:

detecting a low impact event to which the vehicle is subjected using said control system;

igniting firstly a first propellant using a first initiator;

generating a first propellant gas using said first propellant;

receiving said first propellant gas in the inflatable;

delaying for a time interval after said igniting firstly step; and igniting secondly a second propellant using a second initiator after said delaying step, said igniting secondly step including motoring a closure cup using products of combustion from said second propellant after ignition thereof.

25. A method for inflating an inflatable in a vehicle using an inflator and a control system, comprising:

detecting a low impact event to which the vehicle is subjected using said control system;

igniting firstly a first propellant using a first initiator;

generating a first propellant gas using said first propellant;

receiving said first propellant gas in the inflatable;

delaying for a time interval after said igniting firstly step; and igniting secondly a second propellant using a second initiator after said delaying step and using a closure cup to prevent entry of products of combustion from said first propellant to said second propellant.

* * * * *